United States Patent
Ma et al.

(10) Patent No.: US 9,622,095 B2
(45) Date of Patent: Apr. 11, 2017

(54) METHOD AND DEVICE FOR MAINTAINING LONG TERM EVOLUTION BASE STATION

(75) Inventors: Weiguo Ma, Beijing (CN); Bing Liu, Beijing (CN); Jiye Tang, Beijing (CN); Yan Wang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 13/382,521

(22) PCT Filed: Jul. 9, 2010

(86) PCT No.: PCT/CN2010/075096
§ 371 (c)(1),
(2), (4) Date: Jan. 5, 2012

(87) PCT Pub. No.: WO2011/003364
PCT Pub. Date: Jan. 13, 2011

(65) Prior Publication Data
US 2012/0099473 A1    Apr. 26, 2012

(30) Foreign Application Priority Data

Jul. 10, 2009  (CN) .......................... 2009 1 0088186
Jul. 9, 2010   (WO) ................ PCT/CN2010/075096

(51) Int. Cl.
*H04W 76/02*   (2009.01)
*H04W 24/04*   (2009.01)
(Continued)

(52) U.S. Cl.
CPC ............ *H04W 24/04* (2013.01); *H04W 76/02* (2013.01); *H04W 88/08* (2013.01); *H04W 92/12* (2013.01)

(58) Field of Classification Search
CPC ..... H04W 24/04; H04W 76/02; H04W 88/08; H04W 92/12; A61K 31/05; A61K 47/10;
(Continued)

(56) References Cited

U.S. PATENT DOCUMENTS

2005/0015484 A1*  1/2005  Brazdrum et al. ............ 709/224
2008/0310378 A1* 12/2008  Kitazoe et al. ............... 370/338
(Continued)

FOREIGN PATENT DOCUMENTS

| CN | 1400757 A |  3/2003 |
|----|-----------|---------|
| CN | 1464759 A | 12/2003 |

(Continued)

OTHER PUBLICATIONS

International Search Report issued International Application No. PCT/CN2010/075096, dated Oct. 8, 2010.
(Continued)

*Primary Examiner* — Andrew Lai
*Assistant Examiner* — M Mostazir Rahman
(74) *Attorney, Agent, or Firm* — Handal & Morofsky, LLC

(57) ABSTRACT

A method and a device for maintaining a Long Term Evolution (LTE) base station are provided by the embodiments of the present invention. Depending on the LTE access network system and air interface characteristics, by making a few processing flow changes in such mode or method, a wireless communication link is established between a network maintenance device and a base station to implement the base station maintenance and data communication. Application of the technical solutions provided by the embodiments of the present invention can implement the base station maintenance and data communication by the wireless mode, reduce the cost of the network maintenance
(Continued)

and prevent the destruction and influence of human factors on the operation and maintenance of the base station.

13 Claims, 6 Drawing Sheets

(51) Int. Cl.
*H04W 88/08* (2009.01)
*H04W 92/12* (2009.01)

(58) Field of Classification Search
CPC ........ A61K 47/32; A61K 47/38; A61K 47/44; A61K 9/0014; A61K 9/0031; A61K 9/0034; A61K 9/0095; A61K 9/02; A61K 9/48
USPC ........................................................ 370/252
See application file for complete search history.

(56) References Cited

U.S. PATENT DOCUMENTS

| | | | |
|---|---|---|---|
| 2010/0188995 A1* | 7/2010 | Raleigh | 370/252 |
| 2010/0296520 A1* | 11/2010 | Matthews et al. | 370/468 |
| 2011/0244874 A1* | 10/2011 | Fodor et al. | 455/450 |

FOREIGN PATENT DOCUMENTS

| | | |
|---|---|---|
| CN | 1547412 A | 11/2004 |
| CN | 101056449 A | 10/2007 |
| WO | 2007043117 A1 | 4/2007 |
| WO | WO 2007043117 A1 | 4/2007 |

OTHER PUBLICATIONS

Extended European Search Report, EP 10796741.6-1857 / 2453693, PCT/CN2010/075096, dated Jul. 11, 2016.

\* cited by examiner

| Application |
|---|
| RRC |
| PDCP |
| RLC |
| MAC |
| PHY |
| RF |

# METHOD AND DEVICE FOR MAINTAINING LONG TERM EVOLUTION BASE STATION

This application claims the priority of China Patent Application Ser. NO. 200910088186.X, entitled A METHOD AND DEVICE FOR MAINTAINING LTE BASE STATION, submitted on Jul. 10, 2009, the contents of which are hereby incorporated in their entirety.

TECHNICAL FIELD

The present disclosure relates generally to communication technology, and, more particularly, to a method and device for maintaining LTE base station.

BACKGROUND OF THE INVENTION

The base station in mobile communication system is mainly in charge of realizing kinds of functions that relates to wireless, providing the interface of accessing system for MS (Mobile Station), connecting MS directly through wireless resource, for this reason, it would have a great effect on mobile communication system if the base station in mobile communication system breaks down.

The breaking down of base station can result from a number of causes, most of them could be classified as following 4 categories:

1. The Malfunction Results from Transmission Problems

Although mobile communication belongs to wireless communication, actually it is a combination of wireless and wire communications. A large amount of data must be transmitted between network side and base station. If transmission channel or data transceiver has went wrong, it will bring problems such as losing synchronization, slipping code, shutting down and so on.

2. The Malfunction Results from Software Problems of Base Station

The software in base station is responsible to coordinate each part of the base station to work orderly and normally. If the IDB data of base station is not match to the condition of the base station, then the base station could not work normally.

3. The Malfunction Results from the Hardware of Base Station

Such malfunctions are common, and the phenomenon of which is obvious, generally the red failure light of malfunctioning hardware would be lighted, but sometimes don't be misled by false experience seemingly.

4. The Malfunction Results from Various Interferences

The interference in mobile communication system could also influence the base station, which include co-channel interference, adjacent channel interference, intermodulation interference and so on. The frequency multiplexing technology is deployed in the terrestrial cellular mobile communication system to enhance the utility rate of frequencies and increase the capacity, meanwhile, various interferences are also introduced.

During routine maintenance, the inappropriate selection of working frequency will cause the base station to stop working correctly when it comes to new station or expansion station. With regard to this maintenance, various factors should be consider closely with network, and choosing appropriate frequency point, so that the interference would be removed.

As there are several possible courses of foregoing maintenance, the data of base station need to be analyzed before the fault is categorized. Therefore the data obtaining of the base station is very important during the course of base station maintaining.

In the present data obtaining scheme of base station, whether for manufacturer or for operator, the internal communication data among boards of base station is obtained either by sending a staff to arrive at the station, who operates a terminal with wired connection to the base station, or by remote login to the base station.

In the implementing procedure of the invention, the applicant found at least following problems in present technique:

In present technique solutions, the data is mostly collected by people arriving at the base station, which needs a large amounts of factitious operations, on one hand it increase the manpower cost, on the other hand the possibility of artificial misoperation is also increased, even for remote data obtaining, wires need to be layout in advance, which would be extremely expensive and it is hard for continued maintenance work.

CONTENTS OF THE INVENTION

The embodiments of the invention provide a method and a device for maintaining a Long Term Evolution (LTE) base station. Depending on the LTE access network system and air interface characteristics, by making a few processing flow changes in such mode or method, a wireless communication link is established between network and NME to implement the maintenance and data obtaining of eNB by NME.

To achieve the above purpose, the embodiments of the invention provide a method for maintaining a Long Term Evolution (LTE) base station, comprising the following steps:

A base station receiving connecting request information sent by the network maintaining equipment (NME), therein, said connecting request information comprises the identification information of said network maintaining equipment;

Said base station identifying whether the equipment which sending the connecting request information is the network maintaining equipment according to the identification information;

If said base station has identified the equipment which sending the connecting request information is the network maintaining equipment, said base station estimating whether there is enough free resource for admitting network maintaining equipment at present;

If said base station has estimated that there is enough free resource for admitting network maintaining equipment at present, said base station establishing communication connecting with network maintaining equipment;

Said base station performs communication with said network maintaining equipment through communication connection, therefore said network maintaining equipment performs maintenance to said base station.

Preferably, before said base station receiving connecting request information sent by the network maintaining equipment (NME), further comprising:

Said base station receiving the random accessing request information sent by the network maintaining equipment;

Said base station sending random accessing response information to said network maintaining equipment, allocating uplink resource for said network maintaining equipment.

Preferably, the method further comprising:

Said network maintaining equipment performing wireless channel measurement;

When said network maintaining equipment estimating the measurement results of wireless channel to be higher than default threshold, said network maintaining equipment sending random accessing request information to said base station.

Preferably, said connecting request information comprises the identification information of said network maintaining equipment, comprising:

Said initial UE-identity field of the connecting request information is random value;

Said accessing reason enumeration value of connecting request information comprising the access Identifier of operation and maintenance.

Preferably, the method comprising:

If said base station has identified the equipment which sending the connecting request information is not the network maintaining equipment, said base station processing as the processing procedure for normal user equipment accessing;

If said base station has identified the equipment which sending the connecting request information is the network maintaining equipment, but said base station has estimated that there is not enough free resource for admitting network maintaining equipment at present, said base station sending connection reject information, rejecting the connection requesting information sent from the network maintaining equipment.

Preferably, said base station performing communication with said network maintaining equipment through communication connection, comprising:

Said base station sending connecting established information to network maintaining equipment through common control channel, establishing communication connecting;

Said base station receiving the connecting establishing completed information sent by the network maintaining equipment through dedicated control channel, completing establishing communication connecting;

Said base station estimating whether establishing communication connecting with network maintaining equipment.

If said base station has estimated establishing communication connecting with network maintaining equipment, said base station sending connection reconfiguring information, establishing RAB of user plane;

Said base station receiving the connection reconfiguring completed information sent from the network maintaining equipment, completing establishing the bearing of user plane.

Preferably, said connection reconfiguring information is also used in configuring each protocol layer in network maintaining equipment;

If said base station has estimated not to establish communication connecting with network maintaining equipment, then the base station processing as the processing procedure for normal user equipment accessing.

Preferably, the method further comprising:

If said base station has received the connection release requesting information sent from network maintaining equipment, or said base station has estimated there is not enough free resource to provide service for other users at present, said base station sending connection releasing information to network maintaining equipment, releasing communication connection; or, If said base station has not been receiving the information sent by network maintaining equipment in pre-defined response time, the BS releasing communication connection.

Preferably, the method further comprising:

Said network maintaining equipment performing wireless channel measurement, when said network maintaining equipment estimating the measurement results of wireless channel to be lower than default threshold, said network maintaining equipment sending connection releasing requesting information to said base station, and receiving the returned connection releasing information from said base station, releasing the communication connection; or, Said network maintaining equipment receiving the returned connection releasing information from said base station directly, releasing the communication connection; or, If said network maintaining equipment has not been receiving the information returned from said base station in pre-defined response time, said network maintaining equipment releasing the communication connection.

On the other hand, the embodiments of the invention provide a Base Station (BS), applying in the LTE system which comprises network maintaining equipment and the BS, comprising:

Communication module, for receiving the connection request information sent by the network maintaining equipment, therein the connecting request information comprises the identification information of network maintaining equipment, and performing communication with network maintaining equipment through established communication connection, performing maintenance to the BS;

Estimation module, connected with communication module, for identifying whether the equipment which sends connection request information is the network maintaining equipment according to the identification information received by the communication module, and estimating whether there is enough free resource to for admitting network maintaining equipment at present when the identification equipment is network maintaining equipment;

Establishing module, connected with communication module and estimation module, for establishing communication connecting with network maintaining equipment when the estimation module has estimated that there is enough free resource for admitting network maintaining equipment at present, and enabling the network maintaining equipment to communicating with BS through the communication module.

Preferably, the BS further comprising:

Management module, connected with communication module and establishing module, for releasing the communication connection established by the establishing module if no information sent by network maintaining equipment is received by the communication module in pre-defined response time, or there is not enough free resource to provide service for other users at present.

On the other hand, the embodiments of the invention provide a Network Maintaining Equipment (NME), applying in the LTE system which comprises network maintaining equipment and the BS, comprising:

Communication module, for sending connection request information to BS, therein the connecting request information comprises the identification information of network maintaining equipment, and receiving the returned information from the BS, and performing communication with the BS through established communication connection, performing maintenance to the BS;

Establishing module, connected with communication module, for establishing communication connecting with the BS when the returned information from the BS and received by the communication module is the connection establishing information, enabling the network maintaining equipment to communicating with BS.

Preferably, the connecting request information comprises the identification information of network maintaining equipment, specific for:

The initial UE-identity field of the connecting request information is random value;

The accessing reason enumeration value of connecting request information comprising the access Identifier of operation and maintenance.

Preferably, the Network Maintaining Equipment further comprising:

Configuration module, for configuring the channel quality threshold of the network where the network maintaining equipment locates;

Measurement module, connected with configuration module and communication module, for performing wireless channel measurement to the network where the network maintaining equipment locates, and measuring whether the result of wireless channel measurement is higher than the channel quality threshold configured by the configuration module;

The communication module, also for sending random accessing request information to base station when measurement module has estimated that the result of wireless channel measurement is higher than the channel quality threshold configured by the configuration module.

Preferably, the Network Maintaining Equipment further comprising:

The Measurement module, also for continuing performing wireless channel measurement to the network where the network maintaining equipment locates after establishing module has established communication connection with the BS, and measuring whether the result of wireless channel measurement is lower than the channel quality threshold configured by the configuration module;

The communication module, also for sending connection releasing request information to BS when measurement module has estimated that the result of wireless channel measurement is lower than the channel quality threshold configured by the configuration module, and receiving the connection releasing information returned from the BS, releasing communication connection.

Preferably, the Network Maintaining Equipment further comprising:

Management module, connected with communication module and establishing module, for releasing the communication connection established by the establishing module if no information sent by BS is received by the communication module in pre-defined response time.

Comparing with present technology, the invention including the following advantages:

Application of the technical solutions provided by the embodiments of the present invention can implement the base station maintenance and data communication by the wireless mode, reduce the cost of the network maintenance and prevent the destruction and influence of human factors on the operation and maintenance of the base station.

BRIEF DESCRIPTION OF THE DRAWINGS

In order to explain the technical program of the present invention more clearly, the following will describe the figures used in the embodiment, obviously, the figure in the following description is only some embodiments of this invention, for the technical personnel in this field, they can also get other figures according to these figures, on the premise of not paying creative labor.

DETAILED DESCRIPTION OF THE EMBODIMENTS OF THE PRESENT INVENTION

As stated in background, maintenance of base station is a time-consuming work with a lot of trouble, the staff need to enter the station room if they want to obtain the data information of base station, and the base stations usually locate in isolated or dangerous area, which is not convenient for staff to work. And, the safety of base station room is also important, the entering and exiting of base station room militate against the safety of station room itself.

To solve foregoing problems, the embodiments of the invention provides a technical schema and specific realization processes to complete foregoing working through air interface, which makes it convenient to maintain and operate base station, except for the necessary factitious operation (such as changing hardware), foregoing work could be completed through the solution, which decreases the needs of entering station room, and largely increases the work efficiency and the safety of station room.

Moreover, even accessing station room through remote login, the wiring is needed, which increase the costs for operator and has potential safety hazard as well. In order to make operator obtaining real-time data, providing more valuable data information for manufacturers, and providing real-time network status to the people who are responsible to make network plan, optimize or maintain the network.

Figure 1:
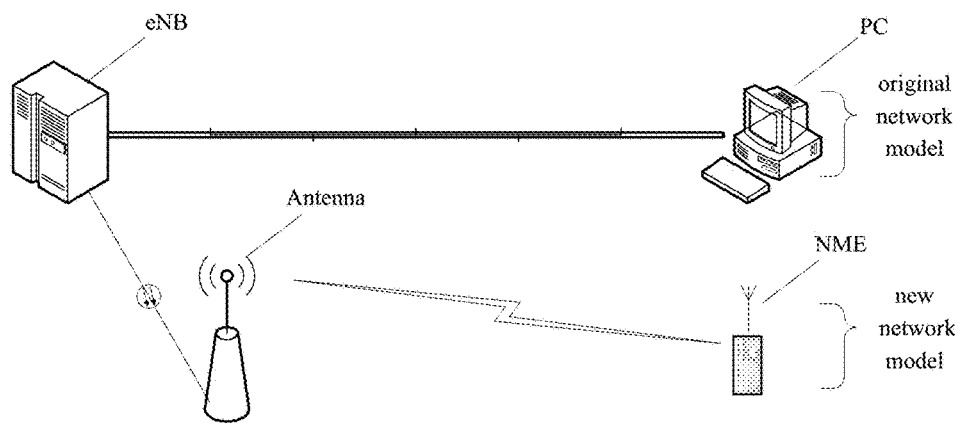
FIG. 1 is the comparison of the network structure which provided by the technical schema of the embodiments of the invention with the original network structure.

To explain the technical schema of the embodiments of the invention in detail, the embodiments of the invention provides a equipment to complete this work, the NME (Network Maintenance Equipment), which is equal to a UE with special functions, communicating with base station wirelessly and uploading and downloading operating instructions and data information by custom data format. And, NME only occupies free radio resource, the priority of which is lower than that of normal service accessing, which has no effect on the network revenue of operator. The comparison of the network structure which provided by the technical schema of the embodiments of the invention with the original network structure is as shown in FIG. 1.

Figure 2:
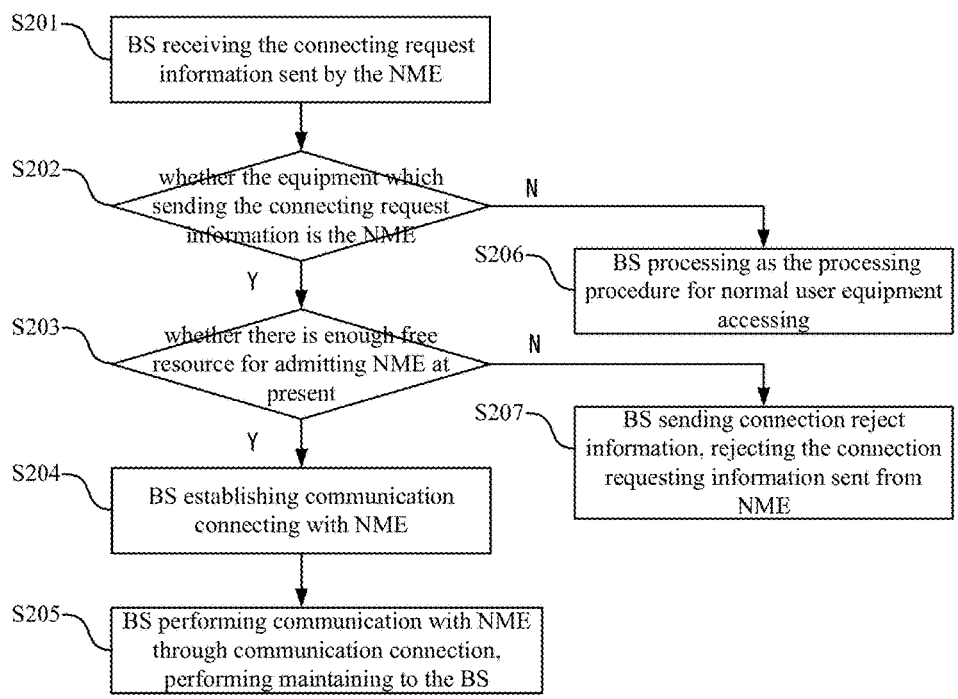
FIG. 2 is a schematic flow of the method for maintaining LTE (Long Term Evolution) base station which is provided by the embodiments of the invention.

As is shown in FIG. 2, a schematic flow of the method for maintaining LTE (Long Term Evolution) base station which is provided by the embodiments of the invention, the method is applied in the LTE system comprising network maintaining equipment and base station, following steps are comprised:

Step 201, the base station receiving the connecting request information sent by the network maintaining equipment.

Therein the connecting request information comprises the identification information of network maintaining equipment, the identification information is comprised in the connecting request information through following ways:

The initial UE-identity field of the connecting request information is random value;

The accessing reason enumeration value of connecting request information comprising the access Identifier of operation and maintenance, specifically the access Identifier of operation and maintenance could be pre-defined as required; the changes in the access Identifier of operation and maintenance will not affect the protection range of present invention.

Specifically, before the base station receiving the connecting request information sent by the network maintaining equipment, comprising:

The base station receiving the random accessing request information sent by the network maintaining equipment;

The base station sending random accessing response information to the network maintaining equipment, allocating uplink resource for the network maintaining equipment.

In specific application scenarios, the channel detecting process of the network maintaining equipment is needed to trigger the step, comprising:

The network maintaining equipment performing wireless channel measurement;

When the network maintaining equipment estimating the measurement results of wireless channel to be higher than default threshold, the network maintaining equipment sending random accessing request information to base station.

Step 202, the base station identifying whether the equipment which sending the connecting request information is the network maintaining equipment according to the identification information.

If the base station has identified the equipment which sending the connecting request information is the network maintaining equipment, executing step 203;

If the base station has identified the equipment which sending the connecting request information is not the network maintaining equipment, executing step 206.

Step 203, the base station estimating whether there is enough free resource for admitting network maintaining equipment at present.

If the base station has estimated that there is enough free resource for admitting network maintaining equipment at present, executing step 204;

If the base station has estimated that there is not enough free resource for admitting network maintaining equipment at present, executing step 207.

Step 204, the base station establishing communication connecting with network maintaining equipment.

In specific application scenarios, the step is realized through following ways:

The base station sending connecting established information to network maintaining equipment through common control channel, establishing communication connecting.

The base station receiving the connecting establishing completed information sent by the network maintaining equipment through dedicated control channel, completing establishing communication connecting.

The base station estimating whether establishing communication connecting with network maintaining equipment.

If the base station has estimated establishing communication connecting with network maintaining equipment, the base station sending connection reconfiguring information, establishing RAB of user plane; if the base station has estimated not to establish communication connecting with network maintaining equipment, then the base station processing as the processing procedure for normal user equipment accessing.

The base station receiving the connection reconfiguring completed information sent from the network maintaining equipment, completing establishing the bearing of user plane.

Therein the connection reconfiguring information is also used in configuring each protocol layer in network maintaining equipment.

Step 205, the base station performing communication with network maintaining equipment through communication connection, performing maintenance to the base station.

Through the step, administrator or BS maintainer could receive the data information of the BS and send control order to the BS through network maintaining equipment, performing maintenance to the BS.

In the processing of executing the step, also comprising ending process, the process could be caused as administrator or BS maintainer estimating there is no need continuing BS maintaining, ending foregoing BS maintaining process, and also could be caused as present system could not provide enough network resource for network maintaining equipment, specifically the ending process could be divided into the ending process on BS side and the ending process on network maintaining equipment side:

For the ending process on BS side, comprising following two situations:

Situations 1, ending the maintaining process according to the application of network maintaining equipment.

If the BS has received the connection release requesting information sent from network maintaining equipment, the BS sending connection releasing information to network maintaining equipment, releasing communication connection.

Situations 2, ending the maintaining process due to the tension of resource.

The BS has estimated there is not enough free resource to provide service for other users at present, the BS sending connection releasing information to network maintaining equipment, releasing communication connection.

Situations 3, ending the maintaining process as there is no response on network maintaining equipment side.

If the BS has not been receiving the information sent by network maintaining equipment in pre-defined response time, the BS releasing communication connection.

For the ending process on network maintaining equipment side, comprising following three situations:

Situations 1, ending the maintaining process as there is not enough resource in present system.

The network maintaining equipment performing wireless channel measurement, when the network maintaining equipment estimating the measurement results of wireless channel to be lower than default threshold, the network maintaining equipment sending connection releasing requesting information to BS, and receiving the returned connection releasing information from the BS, releasing the communication connection.

Situations 2, ending the maintaining process according to the instruction on the BS side.

The network maintaining equipment receiving the returned connection releasing information from BS directly, releasing the communication connection.

Situations 3, ending the maintaining process as there are no responses on BS side.

If the network maintaining equipment has not been receiving the information returned from BS in pre-defined response time, the network maintaining equipment releasing the communication connection.

In specific application scenarios, whichever the foregoing ending process is applied will not affect the protection range of present invention.

Step 206, The BS processing as the processing procedure for normal user equipment accessing.

Step 207, The BS sending connection reject information, rejecting the connection requesting information sent from the network maintaining equipment.

With the technical schema of the embodiments of the present invention, the BS side is made to identify the accessing or existence of NME through some kind of identification convention field or means of identification, so as to establish the radio link in communicating with the NME or communicating, and performing data transmission through conventional data format, completing preconceived data transmission and maintaining working. And completing foregoing work without denying the needs of normal UE accessing, which achieves the goal of maintaining system.

The implementation provide by the embodiments of the invention is suitable for LTE system of various protocol version, and applies to the LTE system of TDD (Time Division Duplexing) and the LTE system of FDD (Frequency Division Duplexing).

With the technical schema of the embodiments of the present invention, so long as maintainer in the coverage area of cell, network element could be maintained (Includes, but is not limited to upgrading, uploading control instructions, downloading the data information of network element, receiving anomaly report of network element and so on), and the real-time data information could be provided, realizing simplifying the obtaining process of BS data information, which decreases the expense on maintaining network, preventing the damage and the effect of human factor from the operation and maintenance of the base station.

To introduce the realization process of the technical schema of the invention further, below, combined with specific application scenarios, the technical proposal of the embodiment of the invention is to be introduced.

To realize that the eNB can identify accessing network equipment as NME correctly, and ensure the compatibility with present communication protocol, when NME initiating a establishing RRC connection request, RRC Connection Request, the Initial UE-Identity in foregoing connection request information uses random number, utilizing the spare3 in the enumeration value of establishment cause, and defining as om-Access (Operation Maintenance Access), therein om-Access is a example of foregoing access Identifier of operation and maintenance in specific application scenarios, the changes in specific format will not affect the protection range of present invention.

The structure of RRC Connection Request message is updated as shown as below:

```
RRCConnectionRequest message
-- ASN1START
RRCConnectionRequest ::=            SEQUENCE {
    criticalExtensions                  CHOICE {
        rrcConnectionRequest-r8             RRCConnectionRequest-r8-IEs ,
        criticalExtensionsFuture            SEQUENCE { }
    }
}
RRCConnectionRequest-r8-IEs ::=             SEQUENCE {
    ue-Identity                         InitialUE-Identity ,
    establishmentCause                  EstablishmentCause ,
    spare                               BIT STRING (SIZE (1))
}
InitialUE-Identity ::=              CHOICE {
    s-TMSI                              S-TMSI ,
    randomValue                             BIT STRING (SIZE (40))
}
EstablishmentCause ::=              ENUMERATED {
                                    emergency , highPriorityAccess ,
    mt-Access , mo-Signalling ,
                                    mo-Data , om-Access , spare2 ,
                                    spare1
}
-- ASN1STOP
```

In specific realization processes, first, allocating the jurisdiction cell of which the target eNB is to be maintained and frequency point information to NME.

Through searching in cells, NME finding a cell comprised in foregoing configuration information to performing presence.

Figure 3:
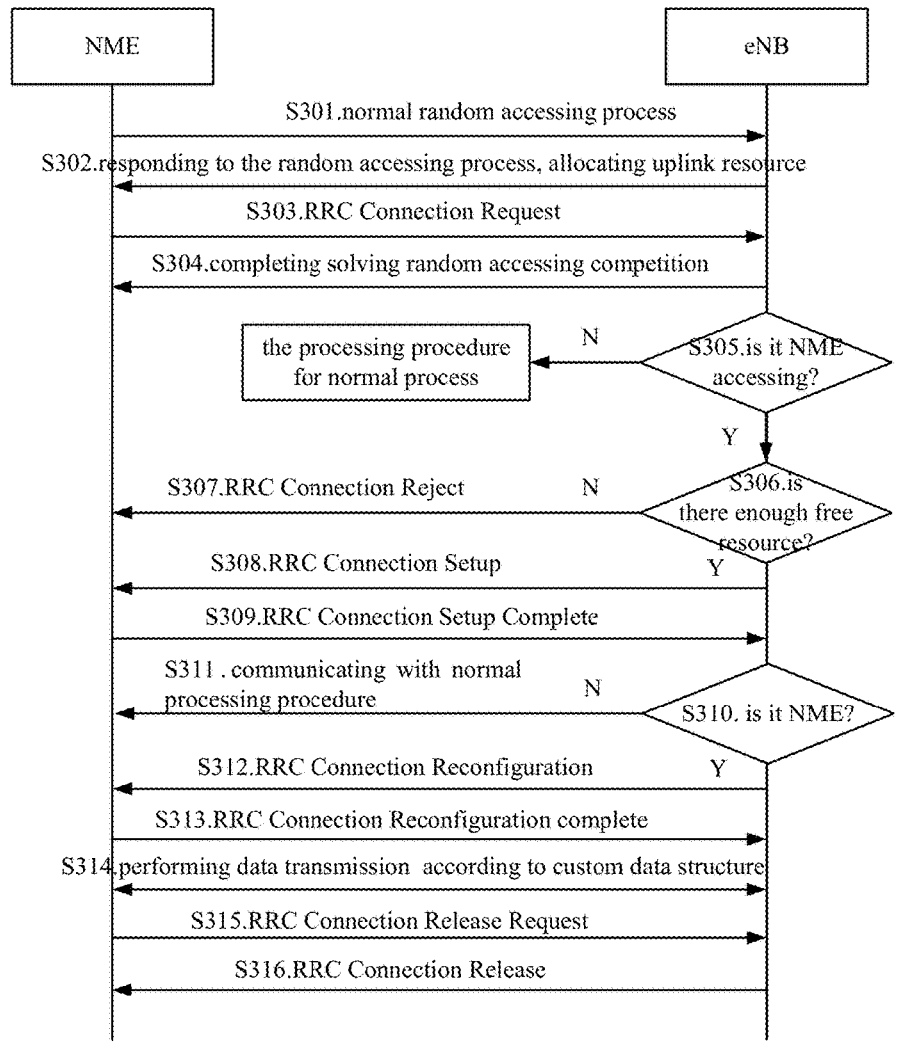
FIG. 3 is a schematic flow of method for maintaining LTE BS in specific application scenarios which is provided by the embodiments of the invention.

As shown in FIG. 3, a schematic flow of method for maintaining LTE BS in specific application scenarios, NME communicating with target eNB through following steps.

Step 301, NME initiating normal random accessing process.

Step 302, eNM responding to the random accessing process initiated by NME, allocating uplink resource.

The uplink resource referred in the step is mainly allocating for follow-up communication information (RRC Connection Request), in specific application scenarios, it could be referred to CCCH.

Step 303, NME sending RRC Connection Request information to eNB on CCCH, initiating RRC connection establishing process.

Step 304, BS completing solving random accessing competition.

Step 305, eNB estimating whether it is the configuration information which is pre-defined and representing NME according to the information in RRC Connection Request information, estimating whether it is NME accessing.

If the estimation is NME accessing, executing step 306;

If the estimation is not NME accessing, which is the normal accessing of other network equipment, processing as the processing procedure for normal process.

Step 306, eNB estimating whether there is enough free resource for admitting the accessing of NME at present.

If eNB has estimated that there is not enough free resource for admitting the accessing of NME, executing step 307.

If eNB has estimated that there is enough free resource for admitting the accessing of NME, executing step 308.

Step 307, eNB sending RRC Connection Reject information to NME on CCCH, rejecting the accessing of the equipment.

Step 308, eNB sending RRC Connection Setup information to NME on CCCH, initiating communication connection establishing process.

Step 309, NME sending RRC Connection Setup Complete information to eNB on DCCH, completing establishing communication connection.

Step 310, after completing establishing communication connection, eNB estimating whether it is NME that establishing communication connection.

If is not NME, then performing communication processing in accordance with normal processes, executing step 311;

If is NME, then establishing RAB actively, executing step 312.

Step 311, eNB communicating with accessing equipment through communication connection in accordance with agreed normal processing procedure.

Step 312, eNB sending RRC Connection Reconfiguration information to NME.

The RRC Connection Reconfiguration information is used to performing the reconfiguration of communication connection parameter, and could coordinate custom data structure.

Therein the RRC Connection Reconfiguration information is also used to configuring each protocol layer in NME.

Step 313, NME sending RRC Connection Reconfiguration complete information to eNB.

Step 314, NME performing data transmission with eNB according to custom data structure.

The specific explanation of data structure would be introduced in follow-up embodiments combined with the structure constitution of NME and no more details are given here.

So much for that, the communication connection has been established between eNB and NME, realizing the communication of data information and control information, which realize the maintaining to BS by administrator and BS maintainer.

Step 315, eNB receiving the RRC Connection Release Request sent from NME, in which requesting releasing communication connection.

Step 316, eNB sending RRC Connection Release to NME, releasing communication connection.

The step 315 and the step 316 represent the maintaining ending process as the initiative application of NME, the reason why NME applies ending maintaining initiatively might be that the administrator and BS maintainer hopping ending maintaining or NME has estimating the channel quality of present system not good, which could not keep the quality of normal maintaining process, hopping ending maintaining process.

Moreover, if eNB have no free resource to meet the needs of other Ue, or NME lost contact with network as the air signal is not good, eNB finding there is no data transmission in a period of time, eNB could directly execute the step 316, releasing communication connection.

It is should be noted that NME could establish its own trigger or ending mechanism for maintaining process so as to avoid the effect of NME accessing to the communication service of present system, specifically following situations are comprised:

Situation 1, the trigger mechanism in accessing process.

NME performing wireless channel measurement, if the signal quality is found to be poor, then the accessing is not going to be initiated, and initiating random accessing when the signal quality become better.

Situation 1, the maintaining ending mechanism in data communication process.

NME performing wireless channel measurement, if the signal quality is found to be poor, then initiatively initiating the request of ending maintaining (such as sending Enumerated REQ RRC Connection Release Request information, requesting eNB to release RRC connection), NME waiting the response from eNB and executing RRC instructions.

In specific application scenarios, for example, the service surface is AM mode, and receiving the returned ARQ responding that the transmission is fail, or the surface is UM/TM mode, but no data are received in a period of time, NME directly releasing RRC connection.

Moreover, combined with foregoing maintaining ending mechanism on eNB side, if eNB has estimated that no communication data is received or communication data is too little in pre-defined response time, then eNB executing RESET according to the protocol, and executing the step 316 to release communication connection. Similarly, NME could realize the situation of network through calculating BER and BLER, if NME has estimated that no communication data is received or communication data is too little in pre-defined response time, then the resource is released, and requesting for re-connection.

Through the technical schema of the embodiments of the invention, the simplification for the process of obtaining BS data information could be realized, which decreases the costs on maintaining network, and prevents the damage and the effect of human factor from the operation and maintenance of the base station.

Figure 4:
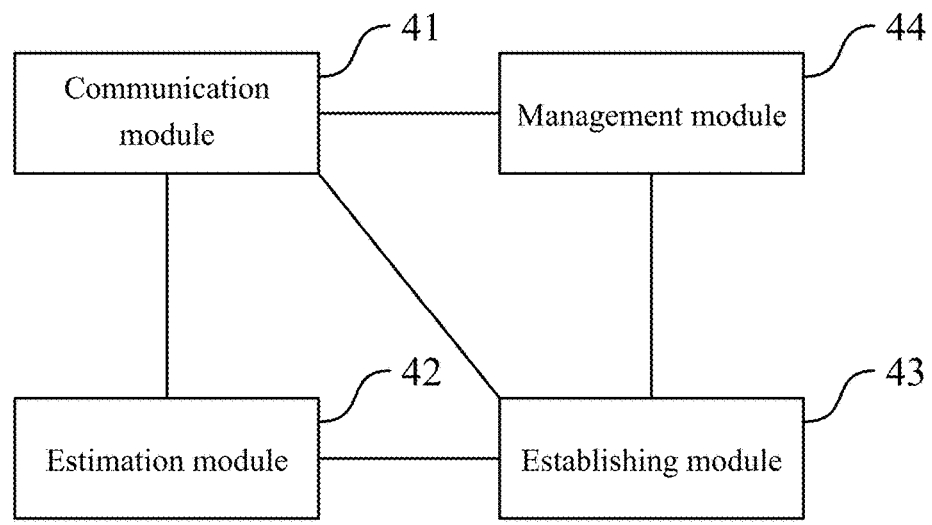
FIG. 4 is a diagram of base station in embodiment of the invention.

To realize foregoing methods, the embodiments of the invention also provides a BS, as shown in FIG. 4, which applies in the LTE system which comprises network maintaining equipment and the BS, comprising:

Communication module 41 for receiving the connection request information sent by the network maintaining equipment, therein the connecting request information comprises the identification information of network maintaining equipment, and performing communication with network maintaining equipment through established communication connection, performing maintenance to the BS;

Estimation module 42, connected with communication module 41, for identifying whether the equipment which sends connection request information is the network maintaining equipment according to the identification information received by the communication module 41, and estimating whether there is enough free resource to for admitting network maintaining equipment at present when the identification equipment is network maintaining equipment.

Establishing module 43, connected with communication module 41 and estimation module 42, for establishing communication connecting with network maintaining equipment when the estimation module 42 has estimated that there is enough free resource for admitting network maintaining equipment at present, and enabling the network maintaining equipment to communicating with BS through the communication module 41.

In specific application scenarios, the BS comprising:

Management module 44, connected with communication module 41 and establishing module 43, for releasing the communication connection established by the establishing module 43 if no information sent by network maintaining equipment is received by the communication module 41 in pre-defined response time, or there is not enough free resource to provide service for other users at present.

Figure 5:
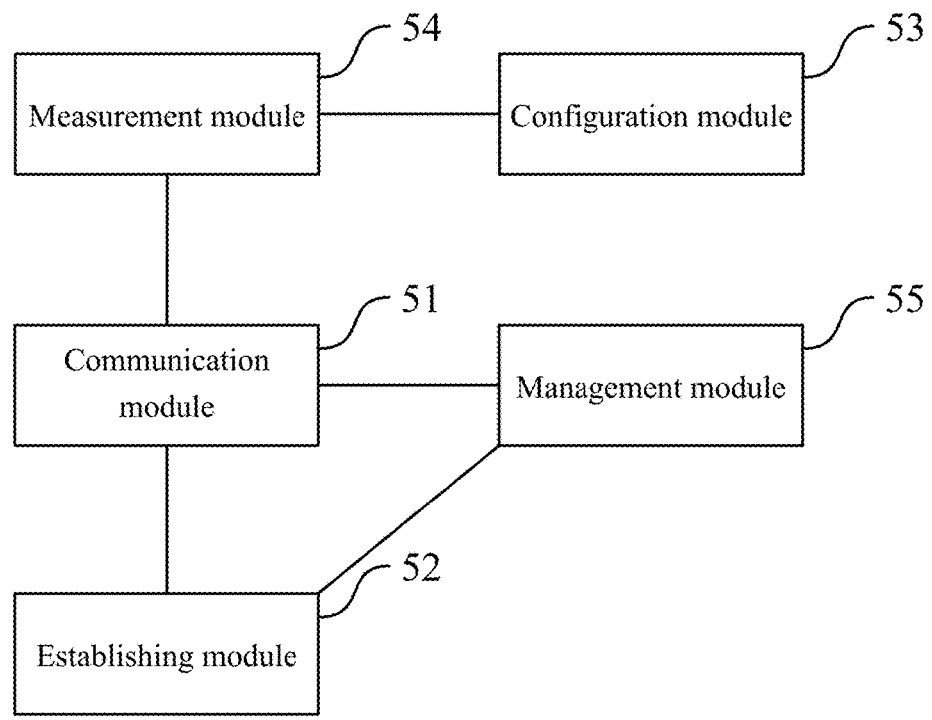
FIG. 5 is a diagram of network maintaining equipment in embodiment of the invention.

On the other hand, the embodiments of the invention also provides a network maintaining equipment, as shown in FIG. 5, which applies in the LTE system which comprises network maintaining equipment and the BS, comprising:

Communication module 51 for sending connection request information to BS, therein the connecting request information comprises the identification information of network maintaining equipment, and receiving the returned information from the BS, and performing communication with the BS through established communication connection, performing maintenance to the BS;

Therein, the connection request information comprising the identification information of network maintaining equipment, specific for:

The initial UE-identity field of the connecting request information is random value;

The accessing reason enumeration value of connecting request information comprising the access Identifier of operation and maintenance, such as foregoing om-Access.

Establishing module 52, connected with communication module 51, for establishing communication connecting with the BS when the returned information from the BS and received by the communication module 51 is the connection establishing information, enabling the network maintaining equipment to communicating with BS.

In specific application scenarios, the network maintaining equipment comprising:

Configuration module 53 for configuring the channel quality threshold of the network where the network maintaining equipment locates;

Measurement module 54, connected with configuration module 53 and communication module 51, for performing wireless channel measurement to the network where the network maintaining equipment locates, and measuring whether the result of wireless channel measurement is higher than the channel quality threshold configured by the configuration module 53.

Communication module 51 also for sending random accessing request information to base station when measurement module 54 has estimated that the result of wireless channel measurement is higher than the channel quality threshold configured by the configuration module 53.

Preferably, measurement module 54 also for continuing performing wireless channel measurement to the network where the network maintaining equipment locates after establishing module 52 has established communication connection with the BS, and measuring whether the result of wireless channel measurement is lower than the channel quality threshold configured by the configuration module 53.

Communication module 51 also for sending connection releasing request information to BS when measurement module 54 has estimated that the result of wireless channel measurement is lower than the channel quality threshold configured by the configuration module 53, and receiving the connection releasing information returned from the BS, releasing communication connection.

Preferably, network maintaining equipment, also comprising:

Management module 55, connected with communication module 51 and establishing module 52, for releasing the communication connection established by the establishing module 52 if no information sent by BS is received by the communication module 51 in pre-defined response time.

Figures 6, 7:
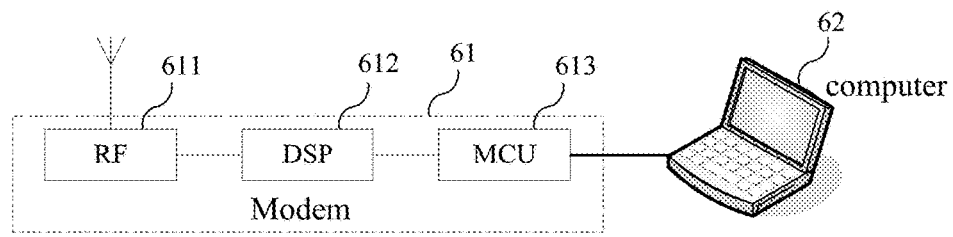
FIG. 6 is a system architecture of NME in specific application scenarios which is provided by the embodiments of the invention.
FIG. 7 is a partition of function structure in specific application scenarios which is provided by the embodiments of the invention.

In actual application scenarios, the system architecture of NME equipment is as shown in FIG. 6, comprising modem 61 and computer 62. The connection between the two is established through wire means such as USB, Cardbus, port and wireless means such as Bluetooth and wifi.

Modem 61 comprising RF module, DSP612 and MCU613 etc. main function mold piece, MCU613 and DSP612 together implementing the protocol function of software such as RRC、PDCP、RLC、MAC、PHY and so on, computer 62 implementing the function of operating and maintaining.

According to the protocol layer, the NME equipment could form a partition of function structure which is shown in FIG. 7, the specific explanation is as follows:

Application (application layer): for processing the data in application layer and the interior maintenance of NME, which is corresponding to the computer 62.

RRC: Radio Link Control, the function is coordinate with protocol.

PDCP、RLC、MAC: Coordinated with the function of L2 protocol stack.

PHY: physical layer protocol stack, in accordance with protocol.

RF: Radio frequency unit, the function of which is the same as UE.

Figure 8:
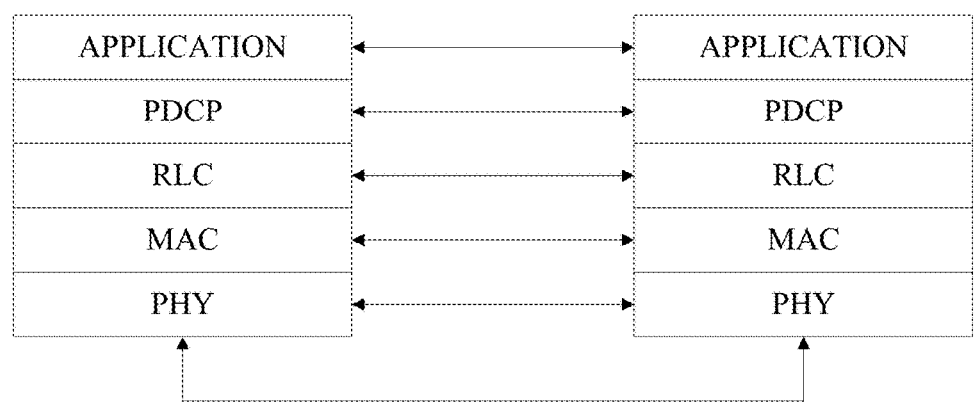
FIG. 8 is a schematic diagram of data communication protocol between NME and eNB which is provided by the embodiments of the invention

According to the structure of protocol layer, the explanation of data transmission process in step 314 is introduced as follows:

As is shown in FIG. 8, a schematic diagram of data communication protocol between NME and eNB. Therein the function and the processing procedure of the protocol layer such as PDCP、RLC、MAC、PHY is in accordance with the protocol standard.

Furthermore, according to the uplink data and the downlink data, the technical schema provided by the embodiments of the invention is introduced as follows.

1. Downlink Data (eNB to NME)

Sending end (eNB): application layer locates at the top of the protocol stack, the structure of which is appointed between NME and NB, the configuration for each layer is completed by the primitive between layers, the communication port between application layer and PDCP layer is custom data interface, similarly, according to the configuration when the link was established, the PDCP layer receiving the data to the link and sending it to the application layer, the communication ports between PDCP layer and RLC layer, RLC layer and MAC layer, MAC layer and PHY layer are in accordance with the standards, and being sent after processing in each layer through air interface.

Receiving end (NME): the signal received by air interface is processed through radio frequency channel, PHY layer, MAC layer, RLC layer, PDCP layer, obtaining data information through agreed communication data structure after the PDCP layer receiving the data, the configuration for each layer is completed by RRC Connection Reconfiguration.

Accordingly, the embodiments of the invention has given a example of data format definition in the communication between NME and eNB, the structure is used to describe the user data communication structure of downlink (eNB to NME), by the structure the NME receiving each data or response information and inter information of NB which is sent to eNB. The specific explanation is as follows:

```
NME_ANSWER
{
    SRC_IP_ADDR(SIZE 64)        The source IP address ( the IP address of
eNB)
    DEST_IP_ADDR(SIZE 64)       The destination IP address ( the IP
address of NME )
    TIME(SIZE 32)       HH/MM/SS/SYS/SUB (The time point at whcih
sending the information )
    REQUEST_DATA_SIZE(SIZE 32)      The size of response data
    NUMBER_OF_REQUEST(SIZE 16)      The number of response type
    REQUEST_TYPE(SIZE 32)       The value of corresponding request
type ( the number is corresponding to the value )
    REQUEST_DATA_SIZE(SIZE 32)      The size of data domain which
is corresponding to the request type( Appear in pairs with REQUEST_TYPE )
    DATA        Data domain (Appear in pairs with the
REQUEST_DATA_SIZE which is not 0 )
}
```

2. Uplink Data (NME to eNB)

Sending end (NME): application layer locates at the top of the protocol stack, the structure of which is appointed between NME and NB, the configuration for each layer is completed by RRC Connection Reconfiguration, the communication port between application layer and PDCP layer is inter realizing, the communication ports between PDCP layer and RLC layer, RLC layer and MAC layer, MAC layer and PHY layer are in accordance with the standards, and being sent through air interface.

Receiving end (eNB): after the signal received by air interface being processed through radio frequency channel, PHY layer, MAC layer, RLC layer, PDCP layer, according to the configuration of establishing link, the data is sent to application layer, the application layer obtaining data information through agreed communication data structure after being received the data.

Accordingly, the embodiments of the invention has given a example of data format definition in the communication between NME and eNB, the structure is used to describe the user data communication structure of uplink (NME to eNB), by the structure the eNB receiving various request information from NME, part information of the cell where the NMe locates and the inter information of NME. The specific explanation is as follows:

```
NME_REQUEST(SIZE bit)
{
    SRC_IP_ADDR(SIZE 64)        The source IP address ( the IP address of
NME)
    DEST_IP_ADDR(SIZE 64)       The destination IP address ( the IP
address of resident eNB )

CELL_ID(SIZE 8)     The cell ID (the ID of cell where eNB resident )
    CELL_FREQUENCE(SIZE 8)      The frequency point of cell (the
frequency point of resident eNB)

TIME(SIZE 32)       HH/MM/SS/SYS/SUB(The time point at whcih
sending the information )

REQUEST_DATA_SIZE(SIZE 32)      The size of request data
    NUMBER_OF_REQUEST(SIZE 16)      The number of request type
    REQUEST_TYPE(SIZE 32)       The value of request type ( the number
is corresponding to the value )

REQUEST_DATA_SIZE(SIZE 32)      The size of data domain of the
request type ( Appear in pairs with REQUEST_TYPE )

DATA        Data domain (Appear in pairs with the
REQUEST_DATA_SIZE which is not 0 )
}
```

Different meaning is corresponding to different request type, the different request type is represent by different REQUEST_TYPE values.

```
REQUEST_TYPE(SIZE 32)
{
    ENUMERATED REQ_SYS_RST = 0
    ENUMERATED REQ_SYS_UPDATA
    ENUMERATED
    REQ_RRC_CONNECTION_RELEASE_REQUEST
    ENUMERATED REQ_RRU _ALARM
    ENUMERATED REQ_BBU _ALARM
    ENUMERATED REQ_CCU _ALARM
    ENUMERATED REQ_PW _ALARM
}
```

It should be noted that the structure of the equipment and the structure of data in the explanations is the preferred embodiments of the invention, any communication purpose agreement or data structure which could realize similar technical effect is appropriate for the method.

Furthermore, the process on network element and NME is also the preferred embodiments of the invention, any technical schema which could realize similar technical effect is within the protection range of present invention. Any equipment which could realize similar function are within the protection range of present invention.

The simplification for the process of obtaining BS data information could be realized, which decreases the costs on maintaining network, and prevents the damage and the effect of human factor from the operation and maintenance of the base station.

Through the description of the embodiments above, the technical personnel in this field can understand clearly that the present invention can be implemented by hardware or software and necessary current hardware platform. Based on this understanding, the technical program of the present invention can be embodied by a form of software products which can be stored in a nonvolatile storage medium (such as CD-ROM, U disk, mobile hard disk, etc.), including a number of instructions for making a computer device (such as personal computers, servers, or network equipments, etc.) implement the methods described in the embodiments of the present invention.

The technical personnel in this field can be understood that the illustration is only schematic drawings of a preferred embodiment, and the module or process is not necessary for the implementation of the present invention.

The technical personnel in this field can be understood that the modules can be distributed in device of the embodiments according to the description of the embodiments above, and also can be varied in one or multiply device of the embodiments. The modules of the embodiments can be combined into a module, and also can be further split into several sub-modules.

The number of the embodiments is only to describe, it does not represent the pros and cons of the embodiments.

The descriptions above are just preferred implement ways of the present invention. It should be pointed that, for general technical personnel in this field, some improvement and decorating can be done, which should be as the protection scope of the present invention.

The invention claimed is:

1. A method for maintaining a long term evolution (LTE) base station, comprising:
   (a) receiving, by said base station, connecting request information sent by an equipment, wherein said connecting request information comprises an identification information of said equipment;
   (b) identifying, by said base station, whether said equipment sending the connecting request information is a network maintaining equipment (NME) according to the identification information;
   (c) if said base station has identified that said equipment is sending the connecting request information as a NME, estimating, by said base station, whether there is enough free resource for admitting said NME at present;
   (d) if said base station has estimated that there is enough free resource for admitting said NME at present, establishing, by said base station, communication connection with said NME; and
   (e) performing communication, by said base station, with said NME through the communication connection, performing maintenance by said NME to said base station; the method further comprising:
   (f) performing, by said NME, a wireless channel measurement, when said NME estimates that a measurement result of the wireless channel being measured is lower than a default threshold, sending, by said NME, connection releasing requesting information to said base station, receiving, by said NME, connection releasing information returned from said base station, and releasing, by said NME the communication connection; or,
   (g) receiving, by said NME, connection releasing information from said base station directly, and releasing, by said NME, the communication connection.

2. The method according to claim 1, wherein before receiving, by said base station, said connecting request information, the method further comprises:
   (h) receiving, by said base station, random accessing request information sent by said NME;
   (i) sending, by said base station, random accessing response information to said NME, and allocating uplink resource for said NME.

3. The method according to claim 2, further comprising:
   (j) performing, by said NME, a wireless channel measurement;
   (k) when said NME estimates that a measurement result of the wireless channel is higher than a default threshold, sending, by said NME, a random accessing request information to said base station.

4. The method according to claim 1, wherein an initial user equipment (UE) identity field of the connecting request information is a random value;
   an accessing reason enumeration value of the connecting request information comprises an operation and maintenance access identifier.

5. The method according to claim 1, further comprising:
   (l) if said base station has identified said equipment sending the connecting request information is not said NME, processing, by said base station, according to a processing procedure for a normal user equipment accessing;
   (m) if said base station has identified said equipment sending the connecting request information is said NME, but said base station has estimated that there is not enough free resource for admitting said NME at present, sending, by said base station, connection rejection information, and rejecting the connection requesting information sent from said NME.

6. The method according to claim 1, wherein performing communication, by said base station, with said NME through the communication connection, comprises:
- sending, by said base station, a connecting established information to said NME through a common control channel, and establishing a communication connection;
- receiving, by said base station, a connecting establishing completed information sent by said NME through a dedicated control channel, and completing the establishment of the communication connection;
- estimating, by said base station, whether the communication connection is established with said NME;
- if said base station has estimated that the communication connection is established with said NME, sending, by said base station, connection reconfiguring information, and establishing radio access bearer (RAB) of user plane; and
- receiving, by said base station, a connection reconfiguring completed information sent from said NME, and completing establishment of the RAB of user plane.

7. The method according to claim 1, wherein said connection reconfiguring information is also used for configuring each protocol layer of said NME; and
- if said base station has estimated not to establish communication connecting with said NME then the base station processes according to a processing procedure for a normal user equipment accessing.

8. The method according to claim 1, further comprising:
- (n) if said base station has received connection release requesting information sent from said NME, or said base station has estimated there is not enough free resource to provide service for other users at present, sending, by said base station, a connection releasing information to said NME, and releasing the communication connection; or,
- (o) if said base station does not receive information sent by said NME in a pre-defined response time, releasing, by said base station, the communication connection.

9. A long term evolution (LTE) system which comprises a network maintaining equipment (NME) and a base station (BS), wherein the BS comprises:
- a processor;
- a memory connected to the processor via a bus interface and for storing programs and data used by the processor in performing an operation; and
- a transceiver connected to the processor and the memory via the bus interface and for receiving and transmitting data,
- wherein the processor calls and executes the programs and data stored in the memory, the processor configured to:
- receive connection request information sent by an equipment, wherein the connecting request information comprises identification information of the equipment, perform communication with the NME through an established communication connection, and perform maintenance to the BS;
- identify whether the equipment which sends the connection request information is said NME according to the identification information received by the processor and estimate whether there is enough free resource for admitting the NME at present when the equipment is identified as said NME;
- establish a communication connection with the NME when the processor has estimated that there is enough free resource for admitting said NME at present, and enable the NME to communicating with the BS through the processor;
- wherein the processor is further configured to receive connection releasing requesting information sent by said NME when said NME estimates that a measurement result of a wireless channel is lower than a default threshold, after said NME performing a wireless channel measurement, sent connection releasing information to the NME, and release the communication connection; or
- sent connection releasing information directly to said NME and release the communication connection.

10. The BS according to claim 9, wherein the processor is further configured to:
- release the communication connection established by the processor if no information sent by the NME is received by the processor in a pre-defined response time, or there is not enough free resource to provide service for other users at present.

11. A long term evolution (LTE) system which comprises a network maintaining equipment (NME) and a base station (BS), the NME comprising:
- a processor;
- a memory connected to the processor via a bus interface and for storing programs and data used by the processor in performing an operation; and
- a transceiver connected to the processor and the memory via the bus interface and for receiving and transmitting data,
- wherein when the processor calls and executes the programs and data stored in the memory, the processor is configured to
- send connection request information to the BS, wherein the connecting request information comprises identification information of the NME, receive information returned from the BS, perform communication with the BS through an established communication connection, and perform maintenance to the BS;
- establish the communication connection with the BS when the information returned from the BS and received by the processor is connection establishing information, and enable the NME to communicate with the BS;
- configure a channel quality threshold of a network where said NME locates; and
- perform wireless channel measurement to the network, and determine whether a result of wireless channel measurement is higher than the channel quality threshold configured by the processor;
- wherein when the processor has estimated that the result of wireless channel measurement is higher than the channel quality threshold configured by the processor, the processor is further configured to send random accessing request information to base station; and
- the processor is further configured to continue performing a wireless channel measurement to the network where the NME locates after the processor has established the communication connection with the BS, and determine whether the result of a wireless channel measurement is lower than the channel quality threshold configured by the processor; and when the processor has estimated that the result of wireless channel measurement is lower than the channel quality threshold configured by the processor, the processor is further configured to send connection releasing request information to the BS, receive connection releasing information returned from the BS, and release the communication connection.

12. The NME according to claim 11, wherein
an initial user equipment (UE) identity field of the connecting request information is a random value;
an accessing reason enumeration value of the connecting request information comprises an operation and maintenance access identifier.

13. The NME according to claim 11, wherein the processor is further configured to:
release the communication connection established by the processor if no information sent by the BS is received by the processor in a pre-defined response time.

* * * * *